US011500958B2

(12) United States Patent
Li et al.

(10) Patent No.: US 11,500,958 B2
(45) Date of Patent: Nov. 15, 2022

(54) METHOD AND APPARATUS FOR PERFORMING CONVOLUTION OPERATION ON FOLDED FEATURE DATA

(71) Applicant: Nanjing Horizon Robotics Technology Co., Ltd., Nanjing (CN)

(72) Inventors: Delin Li, Beijing (CN); Kun Ling, Beijing (CN); Liang Chen, Beijing (CN); Jianjun Li, Beijing (CN)

(73) Assignee: Nanjing Horizon Robotics Technology Co., Ltd., Nanjing (CN)

( * ) Notice: Subject to any disclaimer, the term of this patent is extended or adjusted under 35 U.S.C. 154(b) by 1023 days.

(21) Appl. No.: 16/202,991

(22) Filed: Nov. 28, 2018

(65) Prior Publication Data

US 2019/0163717 A1 May 30, 2019

(30) Foreign Application Priority Data

Nov. 28, 2017 (CN) .......................... 201711212000.8

(51) Int. Cl.
*G06F 17/15* (2006.01)
*G06N 20/10* (2019.01)
(Continued)

(52) U.S. Cl.
CPC ............ *G06F 17/153* (2013.01); *G06F 7/501* (2013.01); *G06F 7/523* (2013.01); *G06N 3/0454* (2013.01); *G06N 3/063* (2013.01); *G06N 20/10* (2019.01)

(58) Field of Classification Search
CPC ........ G06N 3/04; G06N 3/0454; G06N 3/063; G06N 20/10; G06F 17/15; G06F 17/153; G06F 7/501; G06F 7/523
See application file for complete search history.

(56) References Cited

U.S. PATENT DOCUMENTS

2020/0089506 A1* 3/2020 Power .................. G06F 9/3897
2020/0125922 A1* 4/2020 Young .................. G06N 3/0481

FOREIGN PATENT DOCUMENTS

WO     03060748 A2     7/2003

OTHER PUBLICATIONS

Du et al., A Streaming Accelerator for Deep Convolutional Neural Networks with Image and Feature Decomposition for Resource-limited System Application, arXiv:1709.05116 [cs.AR], Sep. 2017 (Year: 2017).*

(Continued)

*Primary Examiner* — Emily E Larocque
(74) *Attorney, Agent, or Firm* — K&L Gates LLP

(57) ABSTRACT

Disclosed are a method and an apparatus for performing convolution operation on folded feature data. The method comprises: reading the folded feature data provided to a convolution layer and an original convolution kernel from a dynamic random access memory (DRAM); pre-processing the folded feature data and the original convolution kernel; storing the pre-processed folded feature data into a static random-access memory (SRAM); folding the pre-processed original convolution kernel in at least one dimension of width or height according to a folding manner of the folded feature data to generate one or more folded convolution kernels corresponding to the original convolution kernel; storing the one or more folded convolution kernels in the SRAM; and reading the pre-processed folded feature data and the one or more folded convolution kernels from the SRAM into a calculation unit for convolving the pre-processed folded feature data with the one or more folded convolution kernels.

17 Claims, 10 Drawing Sheets

(51) Int. Cl.
  *G06F 7/501*   (2006.01)
  *G06F 7/523*   (2006.01)
  *G06N 3/04*    (2006.01)
  *G06N 3/063*   (2006.01)

(56) References Cited

OTHER PUBLICATIONS

Aravind Vasudevan et al: "Parallel Multi Channel convolution using General Matrix Multiplication", 2017 IEEE 28th International Conference on Application-Specific Systems, Architectures and Processors (ASAP), Jul. 3, 2017 (Jul. 3, 2017), pp. 19-24, XP055569367, DOI: 10.1109/ASAP.2017.7995254, ISBN: 978-1-5090-4825-0.

Extended European Search Report for Application No. 18208803.9, dated Apr. 1, 2019, 11 pages.

Qiang Lan et al: "High Performance Implementation of 3D Convolutional Neural Networks on a GPU", Computational Intelligence and Neuroscience, vol. 2017, Nov. 8, 2017 (Nov. 8, 2017), pp. 1-8, XP055568904, US ISSN: 1687-5265, DOI: 10.1155/2017/8348671.

Xiaoming Chen et al: "Optimizing Memory Efficiency for Convolution Kernels on Kepler GPUs", arxiv.org, Cornell University Library, 201 Olin Library Cornell University Ithaca, NY 14853, May 29, 2017 (May 29, 2017), XP080766540, DOI: 10.1145/3061639.3062297 (6 pages).

Yuan Du et al: "A Streaming Accelerator for Deep Convolutional Neural Networks with Image and Feature Decomposition for Resource-limited System Applications", Sep. 15, 2017 (Sep. 15, 2017), XP055569322, Retrieved from the Internet: URL:https://arxiv.org/ftp/arxiv/papers/1709/1709.05116.pdf [retrieved on Mar. 14, 2019] (5 pages).

* cited by examiner

METHOD AND APPARATUS FOR PERFORMING CONVOLUTION OPERATION ON FOLDED FEATURE DATA

TECHNICAL FIELD OF THE DISCLOSURE

The present disclosure generally relates to a technical field of convolutional neural network, and more particularly, to a method and an apparatus for performing a convolution operation on folded feature data.

BACKGROUND

Deep learning technologies based on convolutional neural network have been widely used in various fields such as image recognition, video analysis, natural language processing, autonomous driving and the like. The convolutional neural network is usually operation intensive, and it is desirable to perform operations in the convolutional neural network efficiently by using hardware such as a general purpose central processing unit (CPU), a graphics processing unit (GPU), or a dedicated accelerator.

SUMMARY

In one aspect, provided are a method and an apparatus for performing a convolution operation on folded feature data. The method comprises: pre-processing an original convolution kernel and the folded feature data provided to a convolution layer; folding the pre-processed original convolution kernel in at least one dimension of width or height in accordance with a folding manner of the folded feature data to generate one or more folded convolution kernels corresponding to the original convolution kernel; and performing the convolution operation on the pre-processed folded feature data using the generated one or more folded convolution kernels.

In another aspect, further provided is an apparatus for performing a convolution operation on folded feature data. The apparatus may comprise one or more processors configured to perform the above method.

In another aspect, further provided is an apparatus for performing a convolution operation on folded feature data. The apparatus may comprise a pre-processing unit configured to pre-process an original convolution kernel and the folded feature data provided to a convolution layer; a folding unit configured to fold the pre-processed original convolution kernel in at least one of width and height dimensions in accordance with the folding manner of the folded feature data to generate one or more folded convolution kernels corresponding to the original convolution kernel; and an operating unit configured to perform the convolution operation on the pre-processed folded feature data using the generated one or more folded convolution kernels.

In another aspect, further provided is a non-temporary storage medium having program instructions stored thereon that, when executed by a computing device, operate to perform the above method.

The method and/or apparatus in accordance with the embodiments of the present disclosure can directly perform a convolution operation on folded feature data without unfolding the folded feature data into conventional unfolded feature data, thereby operation efficiency may be improved.

BRIEF DESCRIPTION OF THE DRAWINGS

FIGS. 12A and 12B show examples of how the feature data are stored in a static random access memory.

DETAILED DESCRIPTION

Figure 1:
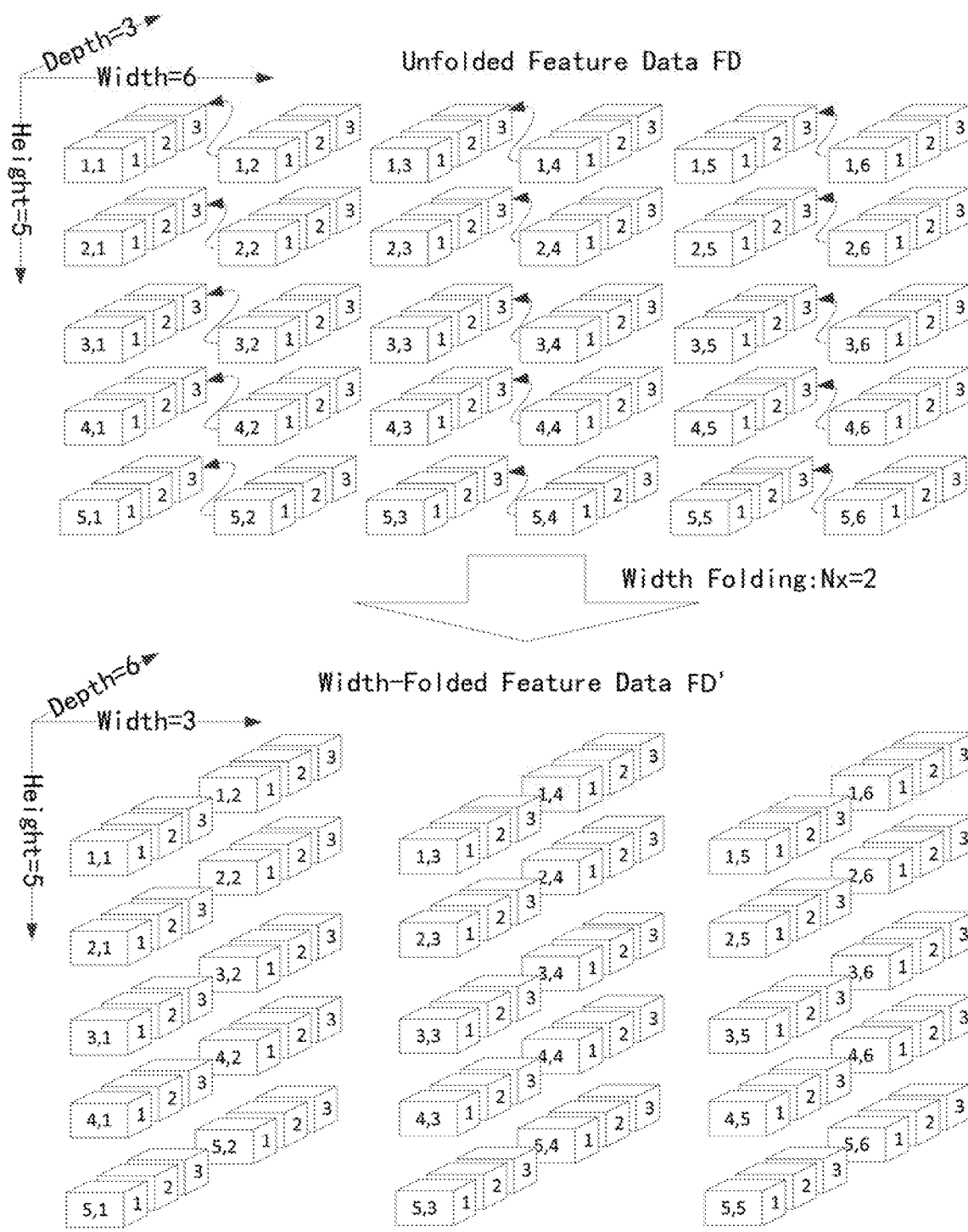
FIG. 1 shows an example of folded feature data according to an embodiment of the present disclosure.

Feature data provided to a convolutional neural network may be regarded as a data cube that has a plurality of dimensions (i.e. different channels) such as width, height, depth, and the like. Each single data in the feature data may correspond to one point in the data cube. Each convolution kernel including weight parameters for the convolution operation in the convolutional neural network may also be regarded as a data cube.

Usually, the term "slice" is used when describing a data cube. When three dimensions of the data cube is considered to correspond to dimensions represented by X-axis, Y-axis, and Z-axis in a three-dimensional Cartesian coordinate system, respectively, a slice of the data cube in a first dimension corresponding to the dimension represented by the X-axis may represent a result obtained by sampling the data in the data cube using a plane orthogonal to the X-axis, which is a data rectangle in a two-dimensional plane represented by the Y-axis and the Z-axis. Formulaically, if the data cube is regarded as a set of points Cube=$\{(x, y, z)|x\in[0,W), y\in[0,H), z\in[0,D)\}$ where W, H, and D are integers greater than 0, a slice of the data cube in the first dimension corresponding to the dimension represented by the X-axis may be represented as Slice$_i$=$\{(y, z)|x=i, y\in[0, H), z\in[0, D)\}$, where $i\in[0, W)$. A slice in which all data are zero (or equivalent to zero) may be referred to as a zero slice.

In addition, the term "pixel" is also usually used to describe the data cube. A pixel of the data cube includes points in the data cube that have the same width (X) and height (Y) coordinates and it may be represented as Pixel$_{ij}$=$\{(z)|x=i, y=j, z\in[0, D)\}$, where $i\in[0, W)$ and $j\in[0, H)$. As seen, a slice may include a plurality of pixels.

Herein, for the convenience of description, the term "slice" is also used when describing data of a certain dimension in the feature data or the convolution kernel, for example, a slice in the width dimension (also referred to as a "width slice" for short), a slice in the height dimension (also referred to as a "height slice" for short), etc.

Herein, when padding or appending of one or more zero slices in a first dimension (e.g., a width dimension) of a data cube A is mentioned, if may mean that the dimension value (e.g., width) of the first dimension of the data cube A is increased by adding one or more zero slices at a certain boundary of the data cube A in the first dimension (e.g., a left or right side in the width dimension), each of the added one or more zero slices having the same dimension values (e.g., a height value and a depth value) as the original data cube A in the other two dimensions (e.g., the height and depth dimensions).

Herein, when padding or appending of one or more zero slices in a first dimension and a second dimension (e.g., a width dimension and a height dimension) of a data cube A is mentioned, it may mean that a dimension value (e.g., width) of the first dimension of the data cube A is increased by adding one or more zero slices at a certain boundary of the data cube A in the first dimension (e.g., a left or right side in the width dimension), each of the added one or more zero slices having the same dimension values (e.g., a height value and a depth value) as the original data cube A in the other two dimensions (e.g., the height and depth dimensions), and then a dimension value (e.g., height) of the second dimension of the data cube A' resulting from increasing the first dimension value (e.g., width) of the data cube A is increased by adding one or more zero slices at a certain boundary of the data cube A' in the second dimension (e.g., an upper or lower side In the height dimension), each of the added one or more zero slices having the same dimension values (e.g., a width value and a depth value) as the data cube A' in the other two dimensions (e.g., the width and depth dimensions).

Herein, when it is mentioned that respective slices of the data cube A are aligned to each other in depth, it may mean that zero (or a value equivalent to zero) is added in the depth direction to the slices (width slices or height slices) of the data cube A that do not have a desired depth value, such that the respective slices of the data cube A after zero-adding have the desired depth value.

Herein, when it is mentioned that padding is performed on the data cube A in a first dimension and/or a second dimension, a number of the padded zero slices may be zero or one or more unless otherwise specified.

The convolutional neural network is usually operation intensive, and it is desirable to perform operations in the convolutional neural network efficiently by using hardware such as a general purpose central processing unit (CPU), a graphics processing unit (GPU), or a dedicated accelerator. In order to improve operation efficiency and/or simplify hardware design, for example, a multi-channel memory may be designed to provide data to adders and/or multipliers that perform a convolution operation, or an operating unit (e.g. a multiplier circuit for performing a convolution operation) may be designed to support multi-channel (e.g. 32 channels) operation.

In another aspect, feature data provided to an input layer of the convolutional neural network may usually have a small number of channels (usually 3 channels or just 1 channel), and feature data input to a convolutional layer relatively preceding in a feedforward reasoning direction of the convolution neural network may also have a small number of channels, causing low resource utilization of the memory and/or operator that support multiple channels at least at a certain stage in the entire feedforward reasoning process of the convolutional neural network. Therefore, conventional feature data may be folded in width and/or height to improve, for example, resource utilization of the memory that supports multiple channels.

However, with a convolutional neural network architecture already being designed, a convolution operation cannot be performed directly on folded feature data using weight parameters in a corresponding convolutional layer. Accordingly, the folded feature data has to be unfolded into conventional unfolded feature data first, and then the unfolded feature data may be provided to the corresponding convolutional layer where the convolution operation is performed on the unfolded feature data using the weight parameters of the convolution layer. This means that the advantages produced by folding feature data are eliminated, again causing waste of hardware resources such as cache memories and/or multipliers, and causing many additional ineffective operations.

Therefore, it is desirable to be able to perform a convolution operation directly on folded feature data with a convolutional neural network architecture that has already been designed.

Folded feature data FD' may be obtained by folding every $N_x$ slices ($N_x$ is an integer greater than 1) of original feature data FD in a width or height dimension D1 together in a depth dimension, and data of all $C_x$ channels of the $(i_{fx} \times N_x + j_{fx})$th slice in the original feature data FD in the dimension D1 correspond to data of consecutive $C_x$ channels starting from the $(j_{fx} \times C_x)$th channel of the $(i_{fx})$th slice in the folded feature data FD' in the dimension D1, where $i_{fx}$ is an integer greater than or equal to 0, $j_{fx}$ is an integer greater than or equal to 0 and less than $N_x$; and $C_x$ is an integer greater than 0.

In addition, folded feature data FD" may be obtained by folding the original feature data FD in both width and height dimensions. For example, the folded feature data FD" may be obtained by further folding every $N_y$ slices ($N_y$ is an integer greater than 1) of the aforementioned folded feature data FD' in the other dimension D2 of the width and height dimensions together in the depth dimension, and data of ail $C_y$ channels of the $(i_{fy} \times N_y + j_{fy})$th slice in the folded feature data FD' in the dimension D2 correspond to data of consecutive $C_y$ channels starting from the $(j_{fy} \times C_y)$th channel of the $(i_{fy})$th slice in the folded feature data FD" in the dimension D2, where $i_{fy}$ is an integer greater than or equal to 0, $j_{fy}$ is an integer greater than or equal to 0 and less than $N_y$, and $C_y$ is an integer greater than 0.

FIG. 1 shows an example of folded feature data FD' folded in a width dimension corresponding to unfolded feature data FD with a width 6, a height 5 and a depth 3. The folded feature data FD' has a width 3, a height 5 and a depth 6, and a splicing number $N_x$ for the width folding is 2.

Figure 2:
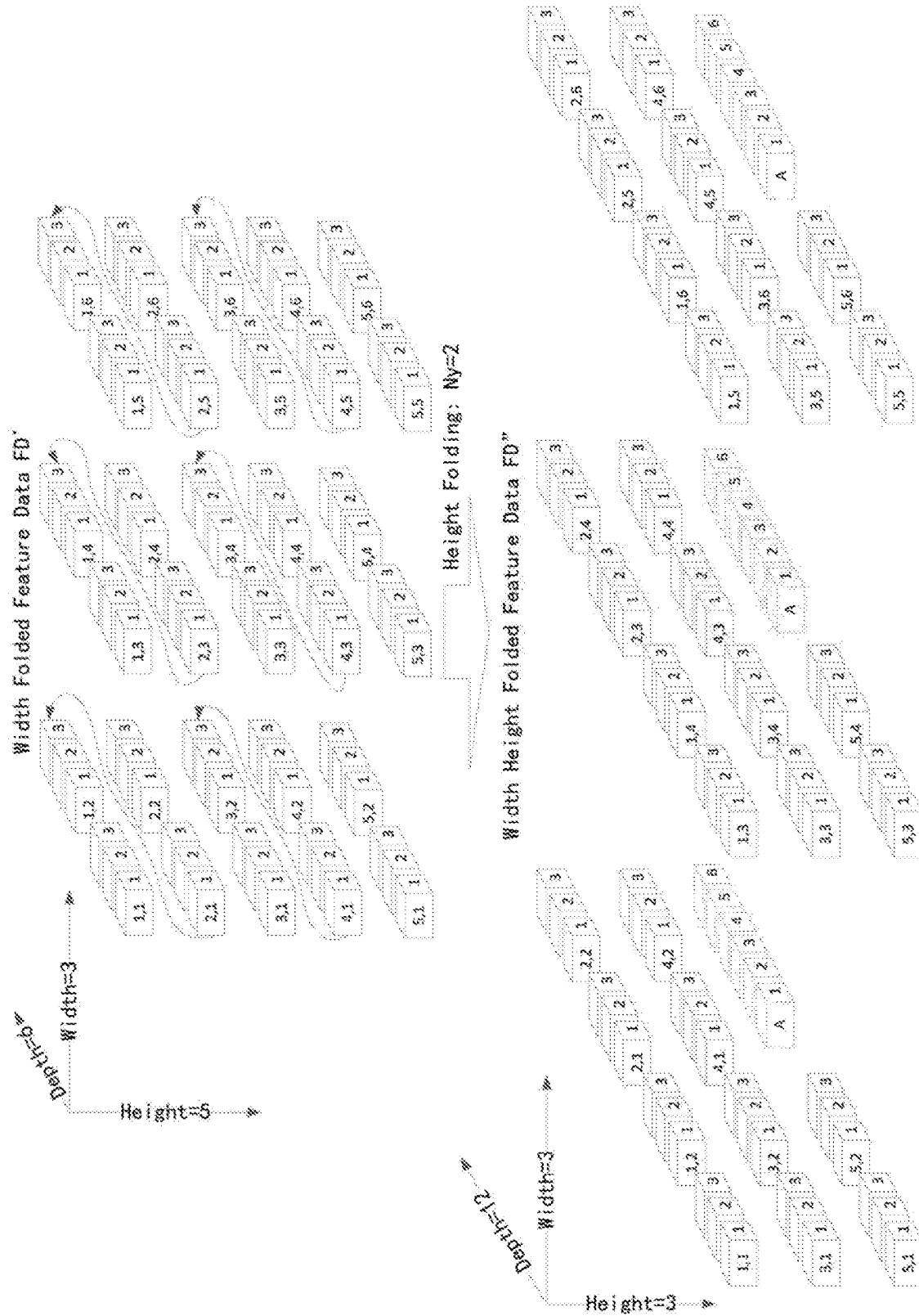
FIG. 2 shows an example of folded feature data according to an embodiment of the present disclosure.

FIG. 2 shows art example of folded feature data FD" folded in both width and height dimensions corresponding to the unfolded feature data FD in FIG. 1. The folded feature data FD" may be obtained by further folding the folded feature data FD' in the height dimension, and it has a width 3, a height 3, a depth 12, and a splicing number $N_y=2$ for the height folding.

In FIG. 1 and FIG. 2, each small cube represents one data value in the feature data (e.g. a pixel value of one color in an RGB image). A front surface of each small cube is labeled with coordinate values in the width and height dimensions in a form of "x, y", and a side surface of each small cube is labeled with a channel number of the data value represented by the small cube in the feature data. For example, as shown in FIG. 1, a label "1.1" on a front surface of a small cube in the feature data FD indicates that the small cube is located in the first row in the height dimension and the first column in the width dimension in the feature data FD. In addition, a label "1" on a side surface of the small cube indicates that the small cube is located in the first level in the depth (or channel) dimension in the feature data FD. All of the small cubes constitute the unfolded feature data FD, and the feature data FD contains 6 width slices, i.e. all small cubes in the first column of the feature data FD (y=1), all small cubes in the second column of the feature data FD (y=2), all small cubes in the third column of the feature data FD (y=3), ail small cubes in the fourth column of the feature data FD (y=4), all small cubes in the fifth column of the feature data FD (y=5), and all small cubes in the column 6 of the feature data FD (y=6).

Herein, the width, height and channel coordinates of each small cube in the folded feature data FD' and FD" shown in FIG. 1 and FIG. 2 are not re-numbered in order to depict correspondence between respective data in the folded feature data and respective data in the unfolded feature data.

As shown in FIG. 2, as the total number of height slices of the folded feature data FD' is not an integral multiple of the height-folding splicing number $N_y$, zero value data (represented by dotted-line boxes A in FIG. 2) are added in a slice of the folded feature data FD' in the third row to align the respective slices in the depth dimension.

It should be understood that FIG. 1 and FIG. 2 show merely examples. In other examples, the folded feature data may be obtained by folding conventional feature data in the height dimension, or by folding conventional feature data in the height dimension first and then folding it in the width dimension, and the folded feature data may include zero value data to align respective slices therein in the depth dimension.

For the folded feature data, at least the folding manner (including the splicing number $N_x$ in association with folding in the dimension D1 and/or the splicing number $N_y$ in association with folding in the dimension D2) used to generate the folded feature data may be known in advance, in addition, the number of zero value data for aligning respective slices of the folded feature data in the depth dimension may also be known in advance.

In addition, if it is clear in the context, the small cubes in the feature data (and the convolution kernel described below) may not be shown, and instead a plane may be used to represent a slice. For example, if three dimensions of width, height, and depth correspond to X-axis, Y-axis, and Z-axis in the three-dimensional Cartesian coordinate system, respectively, a plane perpendicular to the X-axis may be used to represent a width slice of the feature data (or the convolution kernel described below).

Figure 3:
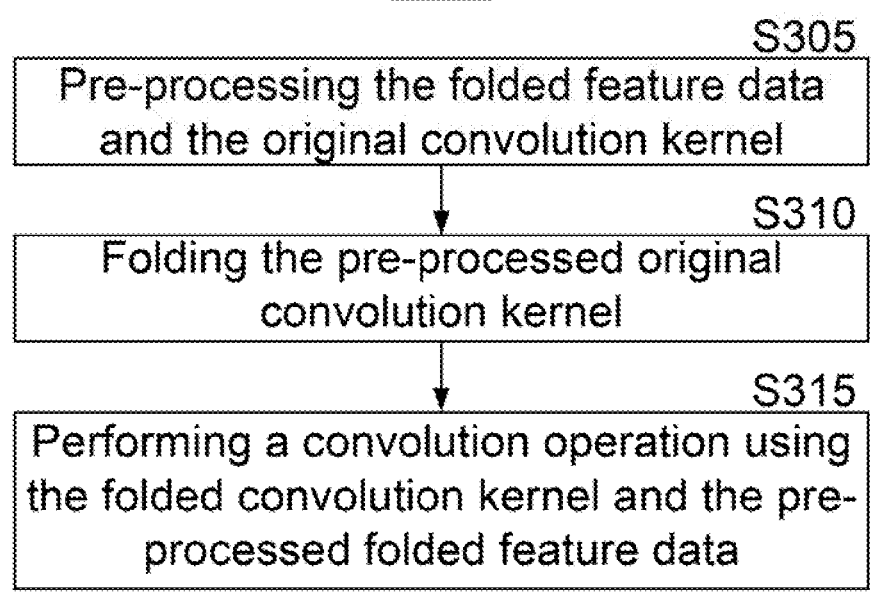
FIG. 3 is a flow chart showing a method of performing a convolution operation on folded feature data according to an embodiment of the present disclosure.

FIG. 3 is a flow chart showing an exemplary method 300 of performing a convolution operation on folded feature data according to an embodiment of the present disclosure.

As shown in FIG. 3, the exemplary method 300 may include:

Step S305, pre-processing the folded feature data and an original convolution kernel of a convolution layer;

Step S310, folding the pre-processed original convolution kernel to generate one or more folded convolution kernels corresponding to the original convolution kernel; and Step S315, performing a convolution operation on the pre-processed folded feature data using the generated one or more folded convolution kernels.

In case of a conventional convolution operation where an original convolution kernel is used to convolve an original unfolded feature data provided to a convolution layer, the original convolution kernel slides on the original unfolded feature data with a stride $S_x$ (greater than or equal to 1) in the width dimension and a stride $S_y$ (greater than or equal to 1) in the height dimension, and convolves a portion of data in the original unfolded feature data corresponding to the sliding window of the kernel in order to obtain desirable output feature data, before performing the convolution operation, zero slices may be padded in a predetermined manner around the original unfolded feature data in the width and height dimensions (including at starting and ending boundaries in the width dimension and at starting and ending boundaries in the height dimension), and the number of zero slices padded around the original unfolded feature data may depend on the predetermined padding scheme, for example, zero, one, or more. For a convolutional neural network that has been designed, weight parameters used in each convolution layer (including a number of convolution kernels, width, height and depth of each kernel, and values included in each kernel) and the padding scheme for the original unfolded feature data to be provided to the convolution layer are already known. Such configurations may be specified in advance by the designer of the convolutional neural network when she/he designs the convolutional neural network, or may be designed or adjusted by learning.

When a folded feature data is provided to the convolution layer of the convolutional neural network, in order to ensure that a desirable correct result may still be obtained using the method according to an embodiment of the present disclosure, the folded feature data and the original convolution kernel may be pre-processed firstly in Step S305.

In an embodiment, if the folded feature data received at the convolution layer is the folded feature data FD' obtained by folding the original unfolded feature data FD in the width or height dimension D1 with the splicing number $N_x$, a padding quantity P1 (P1≥0) for padding at the starting boundary of the original unfolded feature data FD in the dimension D1 may be determined according to the padding scheme specified by the convolution layer for the original unfolded feature data FD, and $\lceil P_1/N_x \rceil$ zero slices may be padded at the starting boundary of the folded feature data FD' in the dimension D1 where "$\lceil \ \rceil$" represents an upward rounding operation.

For the ending boundary of the folded feature data FD' in the dimension D1, a dimension value $FV_x'$ of the folded feature data FD' in the dimension D1 (e.g., a width value in a case that D1 is the width dimension), and a dimension value $KV_x$ and a stride $S_x$ of the original convolution kernel K of the weight parameters of the convolution layer in the dimension D1 may be determined firstly, if a result of calculating $((FV_x'+\lceil P_1/N_x \rceil) \times N_x - KV_x)$ is not an integral multiple of $S_x$, $P_2'$ zero slices may be padded at the ending boundary of the folded feature data FD' in the dimension D1 so that a result of calculating $((FV_x'+\lceil P_1/N_x \rceil) \times N_x - P_2')$ is an integral multiple of $S_x$.

For the ending boundary of the folded feature data FD' in the dimension D1, an expected dimension value $$KV_x' = \left\lceil \left( \left( \frac{N_x}{(N_x, S_x)} - 1 \right) \times S_x + KV_x \right) \Big/ N_x \right\rceil$$

of the folded convolution kernel in the dimension D1 may also be calculated firstly where $(N_x, S_x)$ represents the greatest common divisor of $N_x$ and $S_x$. Then, if $N_x \neq S_x$, the padding quantity $P_2'$ at the ending boundary of the folded feature data FD' in the dimension D1 may be determined such that the result value of $(P_2'+\lceil P_1/N_x \rceil+FV_x'-KV_x')$ is an integral multiple of $S_x$; otherwise, the padding quantity $P_2'$ at the ending boundary of the folded feature data FD' in the dimension D1 may be determined such that $P_2'<KV_x'$.

In addition, the starting and/or ending boundaries of the folded feature data FD' in the other dimension D2 of width and height may be padded according to the padding scheme specified by the convolution layer to pad the original feature data FD in the dimension D2.

In addition, $\lceil P_1/N_x \rceil \times N_x - P_1$ zero slices may be padded at the starting boundary of the original convolution kernel in the dimension D1.

In other embodiments, if the folded feature data received at the convolution layer is the folded feature data FD" obtained by folding the original unfolded feature data FD in both width and height dimensions, for example, by folding the original unfolded feature data FD firstly in the width or height dimension D1 with the splicing number $N_x$ to obtain the folded feature data FD' and then folding the folded feature data FD' in the other dimension D2 of width and height with the splicing number $N_y$, the folded feature data FD" may be padded according to the same padding scheme described above with respect to padding at the starting and ending boundaries of the folded feature data FD' in the dimension D1.

Then, the padding quantity $P_2(P_2 \geq 0)$ for padding at the starting boundary of the feature data FD in the dimension D2 may be determined according to the padding scheme specified by the convolution layer for the feature data PD, and $\lceil P_2/N_y \rceil$ zero slices may be padded at the starting boundary of the folded feature data FD" in the dimension D2.

For the ending boundary of the folded feature data FD' in the dimension D2, a dimension value $FV_y'$ of the folded feature data FD" in the dimension D2 (e.g., a height value in a case that D2 is the height dimension), and a dimension value $KV_y$ and a stride $S_y$ of the original convolution kernel K of the weight parameters of the convolution layer in the dimension D may be determined firstly. If a result of calculating $((FV_y'+\lceil P_2/N_y \rceil) \times N_y - KV_y)$ is not an integral multiple of $S_y$, $P_3'$ zero slices may be padded at the ending boundary of the folded feature data FD" in the dimension D2 so that a result of calculating $((FV_y'+\lceil P_2/N_y \rceil) \times N_y - KV_y + P_3')$ is an integral multiple of $S_y$.

For the ending boundary of the folded feature data FD" in the dimension D2, an expected dimension value $$KV_y' = \left\lceil \left(\left(\frac{N_y}{(N_y, S_y)} - 1\right) \times S_y + KV_y\right) / N_y \right\rceil$$

of the folded convolution kernel in the dimension D2 may also be calculated firstly, where $(N_y, S_y)$ represents the greatest common divisor of $N_y$ and $S_y$. Then, if $N_y \neq S_y$, the padding quantity $P_3'$ at the ending boundary of the folded feature data FD" in the dimension D2 may be determined such that the result value of $(P_3'+\lceil P_2/N_y \rceil+FV_y'-KV_y')$ is an integral multiple of $S_y$; otherwise, the padding quantity $P_3'$ at the ending boundary of the folded feature data FD" in the dimension D2 may be determined such that $P_3'<KV_y'$;

In addition, $\lceil P_1/N_x \rceil \times N_x - P_1$ zero slices may be padded at the starting boundary of the original convolution kernel K in the dimension D1, and $\lceil P_2/N_y \rceil \times N_y - P_2$ zero slices may be padded at the starting boundary of the original convolution kernel K in the dimension D2.

For example, assume that in the example shown in FIG. 2, the convolution kernel K of the weight parameters for the feature data FD has a width 3, a height 3, a depth 3, and a convolution stride 1 in each of width and height, and the padding scheme specified for the feature data FD is to pad the left and right sides each with one column (i.e., one zero slice) and not to pad the upper and lower sides. Then in Step S305, as shown in FIG. 4, the folded feature data FD" of FIG. 2 may be padded with one ($\lceil 1/2 \rceil=1$) zero slice FP on the left side and one ($\lceil (1-3 \times 2+6)/2 \rceil=1$) zero slice FP on the right side to generate a pre-processed folded feature data FD'" having a width 5, and the original convolution kernel K may be padded with one ($\lceil 1/2 \rceil \times 2-1=1$) zero slice KP on the left side to generate a pre-processed convolution kernel K' having a width 4.

Figure 4:
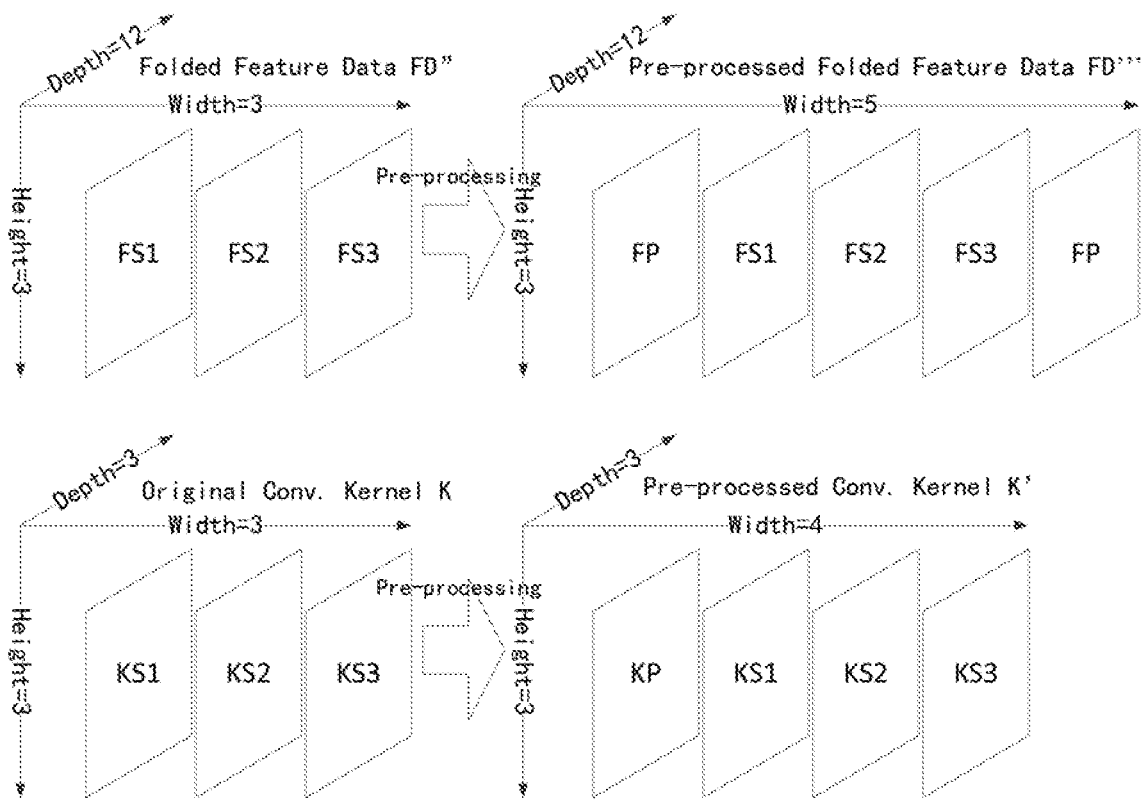
FIG. 4 shows an example of pre-processing folded feature data and an original convolution kernel according to an embodiment of the present disclosure.

Although only one original convolution kernel is shown in the example of FIG. 4, it should be understood that the weight parameters of the convolution layer may also include a plurality of convolution kernels. In such a case, each convolution kernel of the weight parameters may be processed according to the method of the embodiment of the present disclosure.

After the folded feature data and the original convolution kernel are pre-processed, the exemplary method 300 may proceed to Step S310 to folding the pre-processed original convolution kernel.

In Step S310, the pre-processed convolution kernel K' may be padded with $k_x \times S_x$ zero slices at the starting boundary in the dimension D1 to generate one or more transformed convolution kernels $K'[k_x]$ corresponding to the original convolution kernel K or the pre-processed convolution kernel K', where $S_x$ is the stride of the original convolution kernel K in the dimension D1, and $k_x$ is an integer greater than or equal to 0. For example, three transformed convolution kernels corresponding to the original convolution kernel K may be generated by using 0 zero slice, $S_x$ zero slices, and $2 \times S_x$ zero slices, respectively.

A maximum value of $k_x$ may be set to limit the number of the transformed convolution kernels. For example, $k_x < E_x$ may be set where $E_x$ may be determined as a value obtained by dividing the least common multiple of $S_x$ and $N_x$ by $S_x$, or a value obtained by dividing $N_x$ by the greatest common divisor of $N_x$ and $S_x$, or a value equal to $N_x$ when $S_x=1$ or $S_x$ and $N_x$ are relatively prime. Thus, $E_x$ transformed convolution kernels $K'[k_x]$ corresponding to the original convolution kernel K or the pre-processed convolution kernel K' may be generated.

Then, each transformed convolution kernel $K'[k_x]$ may be folded in the dimension D1 by splicing every $N_x$ slices consecutive in the dimension D1 together in the depth dimension to generate a corresponding folded convolution kernel $K"[k_x]$ such that data of all $C_x$ channels of the $(i_{kx} \times N_x+j_{kx})$th slice in the folded convolution kernel $K"[k_x]$ in the dimension D1 correspond to data of consecutive $C_x$ channels starting from the $(j_{kx} \times C_x)$th channel of the $(i_{kx})$th slice in the transformed convolution kernel $K'[k_x]$ in the dimension D1, respectively, where $i_{kx}$ is an integer greater than or equal to 0, and $j_{kx}$ is an integer greater than or equal to 0 and less than $N_x$.

The generated transformed convolution kernels $K'[k_x]$ may have different dimension values in the dimension D1 (e.g., width values in a case where D1 denotes width), or one or more transformed convolution kernels $K'[k_x]$ have a dimension value in the dimension D1 that is not an integral multiple of $N_x$, so that slices in the corresponding folded convolution kernel $K"[k_x]$ are not aligned with each other in the depth dimension.

In such a case, a desirable dimension value $EV_x$ of each transformed convolution kernel $K'[k_x]$ in the dimension D1 may be determined from $E_x$, $S_x$, $N_x$ and the dimension values $V_x$ of the pre-processed convolution kernel K' in the dimension D1. For example, the desirable dimension value $EV_x$ of each transformed convolution kernel $K'[k_x]$ in the dimension D1 may be determined by an equation $EV_x=\lceil((E_x-1)\times S_x+V_x)/N_x\rceil\times N_x$. If the dimension value of the transformed convolution kernel $K'[k_x]$ in the dimension D1 is smaller than $EV_x$, then the transformed convolution kernel K'[kx] may be adjusted by appending a zero slice(s) at the ending boundary of the transformed convolution kernel $K'[k_x]$ in the dimension D1 such that the dimension value of the adjusted transformed convolution kernel $K'[k_x]$ in the dimension D1 becomes $EV_x$. Then, the adjusted transformed convolution kernel $K'[k_x]$ may be folded in the dimension D1 to generate the corresponding folded convolution kernel $K''[k_x]$.

Characteristics or capability of hardware (e.g., memory or operator supporting multiple channels) may also be utilized directly. For example, in a case where hardware is capable of aligning the channels, a channel that does not have any real data may be automatically treated by the hardware as having a zero value. In such a case, the channels of each slice in the folded convolution kernel may be automatically aligned by the hardware. For example, if the hardware supports 32 channels simultaneously, the number of channels of each folded convolution kernel may be automatically aligned to 32 channels by the hardware.

In an embodiment, if the folded feature data received at the convolution layer is obtained by only folding the original unfolded feature data FD in the dimension, then in Step S310, the obtained folded convolution kernel $k''[k_x]$ may be used as the final folded convolution kernel.

In another embodiment, if the folded feature data received at the convolution layer is the folded feature data FD" obtained by folding the original unfolded feature data FD in the dimension D1 using the splicing number $N_x$ to generate the folded feature data FD' and then folding the folded feature data FD' in the dimension D2 using the splicing number $N_y$, then in Step S310, each folded convolution kernel $K''[k_x]$ may be further folded in the dimension D2 using the splicing number $N_y$. The process of folding the folded convolution kernel $K''[k_x]$ in the dimension D2 using $N_y$ is similar to the process of folding the pre-processed convolution kernel K' in the dimension D1 using $N_x$.

For example, the folded convolution kernel $K''[k_x]$ may be padded with $k_y \times S_y$ zero slices at the starting boundary in the dimension D2 to generate one or more transformed convolution kernels $K''[k_x, k_y]$ corresponding to the folded convolution kernel $K''[k_x]$, where $S_y$ is the stride of the original convolution kernel K in the dimension D2, and $k_y$ is an integer greater than or equal to 0. Also, a maximum value of $k_y$ may be set to limit the number of transformed convolution kernels $K''[k_x,k_y]$. For example, $k_y$ may be set to be less than $E_y$ ($k_y<E_y$) where $E_y$ may be determined as a value obtained by dividing the least common multiple of $S_y$ and $N_y$ by $S_y$, or a value obtained by dividing $N_y$ by the greatest common divisor of $N_y$ and $S_y$, or a value equal to $N_y$ in a case where $S_y=1$ or $S_y$ and $N_y$ are relatively prime. Thus, $E_y$ transformed convolution kernels $K''[k_x,k_y]$ corresponding to the folded convolution kernel $K''[k_x]$ may be generated, or $E_x \times E_y$ transformed convolution kernels $K''[k_x,k_y]$ corresponding to the convolution kernel K or the adjusted convolution kernel K' may be generated.

Then, each transformed convolution kernel $K''[k_x,k_y]$ may be folded in the dimension D2 by splicing every $N_y$ slices consecutive in the dimension D2 together in the depth dimension to generate a corresponding folded convolution kernel $K'''[k_x,k_y]$ such that data of all $C_y$ channels of the $(i_{ky} \times N_y + j_{ky})$th slice in the folded convolution kernel $K'''[k_x, k_y]$ in the dimension D2 correspond to data of consecutive $C_y$ channels starting from the $(j_{ky} \times C_y)$th channel of the $(i_{ky})$th slice in the transformed convolution kernel $K''[k_x,k_y]$ in the dimension D2, respectively, where $i_{ky}$ is an integer greater than or equal to 0, and $j_{ky}$ is an integer greater than or equal to 0 and less than $N_y$.

A desirable dimension value $EV_y$ of each transformed convolution kernel $K''[k_x,k_y]$ in the dimension D2 may be determined from $E_y$, $S_y$, $N_y$ and the dimension values $V_y$ of the pre-processed convolution kernel K' in the dimension D2. For example, the desirable dimension value $EV_y$ of each transformed convolution kernel $K''[k_x,k_y]$ in the dimension D2 may be determined by an equation $EV_y=\lceil((E_y-1)\times S_y+V_y)/N_y\rceil\times N_y$. If the dimension value of the transformed convolution kernel $K''[k_x,k_y]$ in the dimension D2 is smaller than $EV_y$, then the transformed convolution kernel $K''[k_x,k_y]$ may be adjusted by appending a zero slice(s) at the ending boundary of the transformed convolution kernel $K''[k_x,k_y]$ in the dimension D2 such that the dimension value of the adjusted transformed convolution kernel $K''[k_x,k_y]$ in the dimension D2 becomes $EV_y$. Then, the adjusted transformed convolution kernel $K''[k_x,k_y]$ may be folded in the dimension D2 to generate the corresponding folded convolution kernel $k'''[k_x,k_y]$.

The obtained $E_x \times E_y$ folded convolution kernels $K'''[k_x, k_y]$ may be used as the final folded convolution kernels.

Figure 5:
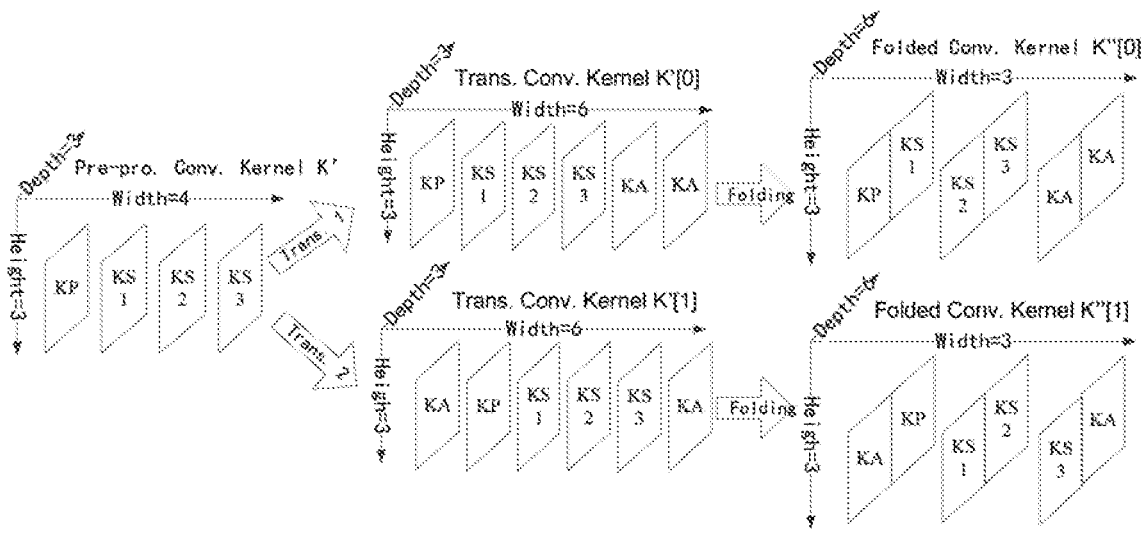
FIG. 5 shows an example of folding a pre-processed original convolution kernel in a dimension according to an embodiment of the present disclosure.

FIG. 5 shows an example in which the convolution kernel K' containing four width slices in FIG. 4 is folded in the width dimension for the folded feature data FD" in FIG. 2. As shown in FIG. 5, as $N_x=2$ and $S_x=1$, if may be determined that the number of transformed convolution kernels corresponding to the convolution kernel K' is 2. Then, the convolution kernel K' may be padded with 0 zero slice at the left side and 2 zero slices KA at the right side to obtain an adjusted transformed convolution kernel K'[0] (Transformation 1), and the convolution kernel K' may be padded with 1 zero slice KA at the left side and 1 zero slice KA at the right side to obtain an adjusted transformed convolution kernel K'[1] (Transformation 2). The adjusted transformed convolution kernels K'[0] and K'[1] each have a width 6 ($\lceil((2-1)\times 1+4)/2\rceil 33 2=6$). Then, the adjusted transformed convolution kernel K'[0] may be folded by splicing the slices KS1, KS3, KA to the end of the slices KP, KS2, KA, respectively, to generate a folded convolution kernel K"[0], and the adjusted transformed convolution kernel K'[1] may be folded by splicing the slices KP, KS2, KA to the end of the slices KA, KS1, KS3, respectively, to generate a folded convolution kernel K"[1]. The folded convolution kernels K"[0] and K"[1] each have a width 3, a height 3, and a depth 8.

Figure 6:
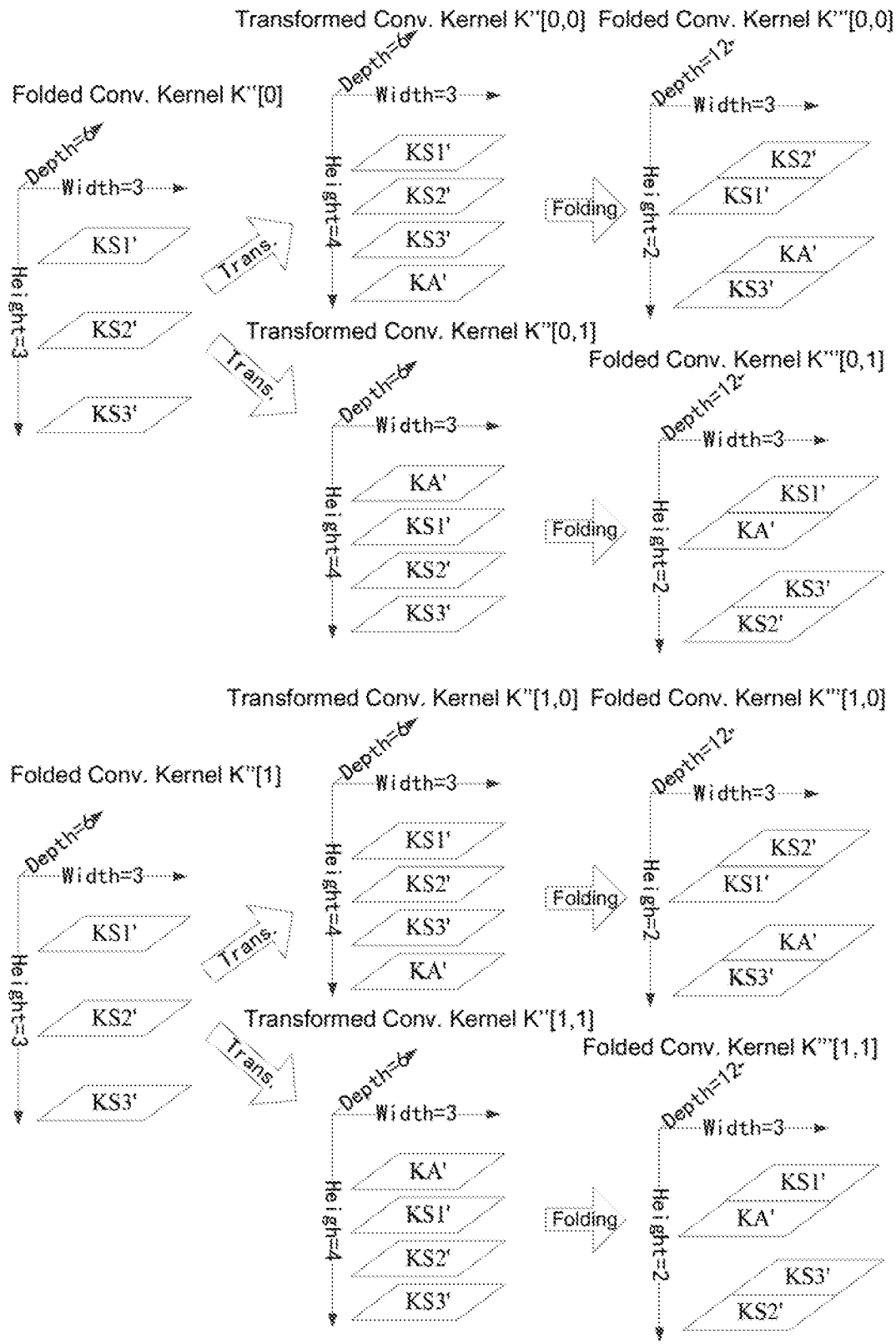
FIG. 6 shows an example of folding a pre-processed original convolution kernel in two dimensions according to an embodiment of the present disclosure.

Then, the folded convolution kernels K"[0] and K"[1] each may be further folded in the height dimension. As shown in FIG. 6, as $N_y=2$ and $S_y=1$, it may be determined that the number of transformed convolution kernels corresponding to the folded convolution kernels K"[0] is 2. Then, the folded convolution kernels K"[0] may be padded with 0 zero slice at the upper side and 1 zero slice KA' at the lower side to obtain an adjusted transformed convolution kernel K"[0,0], and the folded convolution kernels K"[0] may be padded with 1 zero slice KA' at the upper side and 0 zero slice KA' at the lower side to obtain an adjusted transformed convolution kernel K"[0,1]. The folded convolution kernels K'[1] may be padded in a similar way to obtain adjusted transformed convolution kernels K"[1,0] and K"[1,1], The kernels K"[0,0], K"[0,1], K"[1,0] and K"[1,1] each have a height 4 ($\lceil((2-1)\times1+3)/2\rceil\times2=4$). The transformed convolution kernel K"[0,0] may be folded by splicing KS2', KA' to the end of KS1', KS3', respectively, to generate a corresponding folded convolution kernel K'''[0,0]. The transformed kernels K"[0, 1], K"[1,0], K"[1,1] may be folded in a similar way to generate corresponding folded convolution kernels K'''[0,1], K'''[1,0], K'''[1,1], respectively. The folded convolution kernels K'''[0,0], K'''[0,1], K'''[1,0], K'''[1,1] each may have a width 3, a height 2, and a depth 12.

The exemplary method 300 may then proceed to Step S315 to perform a convolution operation on the pre-processed folded feature data obtained in Step S305 using the one or more folded convolution kernels obtained in Step S310.

If the folded feature data received at the convolution layer is the folded feature data FD' obtained by folding the original unfolded feature data FD in the dimension D1, then in Step S315, the convolution operation may be performed on the pre-processed folded feature data obtained in Step S305 using the $E_x$ folded convolution kernels K"[$k_x$] obtained in Step S310. In such a case, if the original convolution kernel K has a stride $S_x$ in the dimension D1 that is equal to $N_x$, then each folded convolution kernel K"[$k_x$] has a stride 1 in the dimension D1; otherwise, the stride of each folded convolution kernel K"[$k_x$] in the dimension D1 is equal to $S_x$. In addition, each folded convolution kernel K"[$k_x$] has a stride in the other dimension D2 of width and height that is equal to the stride $S_y$ of the original convolution kernel K in the dimension D2.

If the folded feature data received at the convolution layer is the folded feature data FD" obtained by folding the original unfolded feature data FD in the dimension D1 according to the splicing number $N_x$ to obtain the folded feature data FD' and further folding the folded feature data FD' in the dimension D2 according to the splicing number $N_y$, then in Step S315, the convolution operation may be performed on the pre-processed folded feature data obtained in Step S305 using the $E_x \times E_y$ folded convolution kernel K'''[$k_x,k_y$] obtained in Step S310. In such a case, if the original convolution kernel K has a stride in the dimension D1 that is equal to $N_x$, then each folded convolution kernel K'''[$k_x,k_y$] has a stride 1 in the dimension D1; otherwise, the stride of each folded convolution kernel K'''[$k_x$, $k_y$] in the dimension D1 is equal to $S_x$. Further, the original convolution kernel K has a stride $S_y$ in the dimension D2 that is equal to $N_y$, then each folded convolution kernel K'''[$k_x,k_y$] has a stride 1 in the dimension D2; otherwise, the stride of each folded convolution kernel K'''[$k_x,k_y$] in the dimension D2 is equal to $S_y$.

In an embodiment, in Step S315, all folded convolution kernels may be used to convolve a same portion of the folded feature data and then move a stride in the dimension D1 or D2 to convolve a next portion of the folded feature data, until all portions of the folded feature data have been convolved generating a final output feature data.

Figure 7:
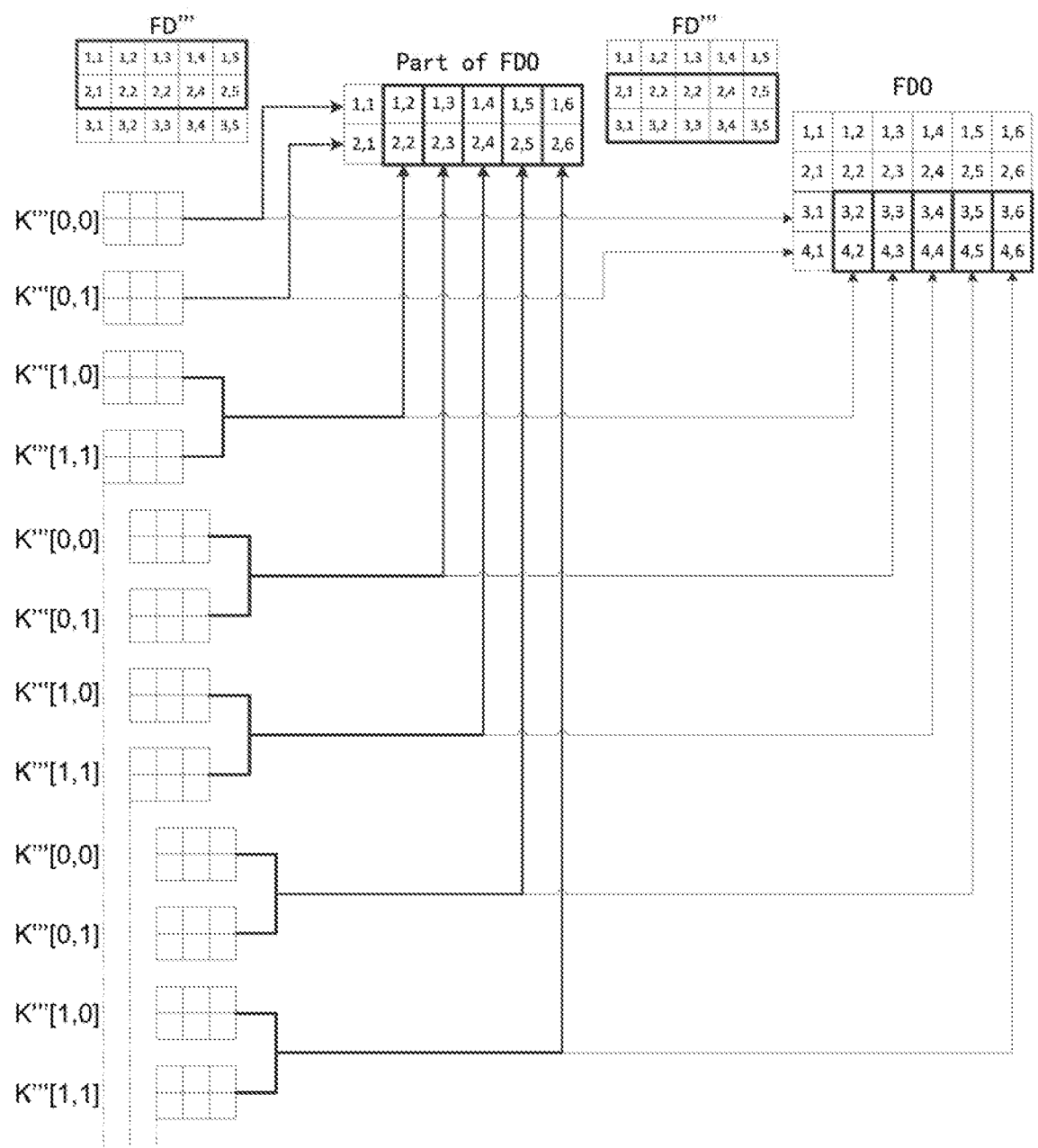
FIG. 7 shows an example of performing a convolution operation according to an embodiment of the present disclosure.

FIG. 7 shows an example of how the convolution operation can be performed. In the example of FIG. 7, the folded convolution kernels K'''[0,0], K'''[0,1], K'''[1,0] and K'''[1,1] in FIG. 6 are used to convolve the folded feature data FD''' in FIG. 4.

As shown in FIG. 7, firstly, the four folded convolution kernels K'''[0,0], K'-[0,1], K'''[1,0] and K'''[1,1] each are used to convolve a portion of the folded feature data FD''' including data (1,1), (1,2), (1,3), (2,1), (2,2) and (2,3) in the first and second rows to obtain a portion of the output feature data FDO including data (1,1), (2,1), (1,2) and (2,2), respectively. Then, the four folded convolution kernels K'''[0,0], K'''[0,1], K'''[1,0], and K'''[1,1] move a stride 1 (i.e. the stride of the original convolution kernel K in width) in width to convolve a portion of the folded feature data FD''' including data (1,2), (1,3), (1,4), (2,2), (2,3), and (2,4) in the first and second rows, resulting In a portion of the output feature data FDO including data (1,3), (2,3), (1,4), and (2,4). Then, the four folded convolution kernels K'''[0,0], K'''[0,1]; K'''[1,0], and K'''[1,1] further move a stride 1 (i.e. the stride of the original convolution kernel K in width) in width to convolve a portion of the folded feature data FD''' including data (1,3), (1,4), (1,5), (2,3), (2,4), and (2,5) in the first and second rows, resulting in a portion of the output feature data FDO including data (1,5), (2,5), (1,8), and (2,6).

After convolving the first and second rows of the folded feature data FD''', the four folded convolution kernels K''' [0,0], K'''[0,1], K'''[1,0], and K'''[1,1] move a stride 1 (i.e. the stride of the original convolution kernel K in height) in height to convolve the second and third rows of the folded feature data FD'''. The convolution operation on the second and third rows of the folded feature data FD''' is similar to the convolution operation on the first and second rows of the folded feature data FD''' using the four folded convolution kernels K'''[0,0], K'''[0,1], K'''[1,0] and K'''[1,1] and a repetitive description thereof will be omitted here.

After convolving the folded feature data FD''' with the four folded convolution kernel K'''[0,0], K'''[1,0], K'''[1,0] and K'''[1,1], a final output feature data FDO is obtained. The last row of the output feature data FDO, i.e., data (4,1), (4,2), (4,3), (4,4), (4,5) and (4,8), may be retained or discarded as needed. For example, if a three-row output feature data is desirable by convolving the original unfolded feature data FD in FIG. 2 with the original convolution kernel K in FIG. 4 (accordingly, the original unfolded feature data FD is not padded in height), the last row including data (4,1), (4,2), (4,3), (4,4), (4,5) and (4,6) of the output feature data FDO may be discarded.

In a case where the weight parameters of the convolution layer include a plurality of convolution kernels, the output feature data FDO in the example of FIG. 7 may correspond to data in a channel of the final output feature data.

In other embodiments, the folded convolution kernel may be used to convolve the entire folded feature data, respectively, in such a case, if does not need to modify convolution instructions for the hardware. However, if one original convolution kernel corresponds to a plurality of folded convolution kernels, a partial result obtained by using each folded convolution kernel will be in multiple channels. Before the output feature data is provided to a next layer of the convolution neural network or regarded as the final output of the entire convolution neural network, the partial result in multiple channels may be re-organized or unfolded to obtain a complete output in one channel.

Figure 8:
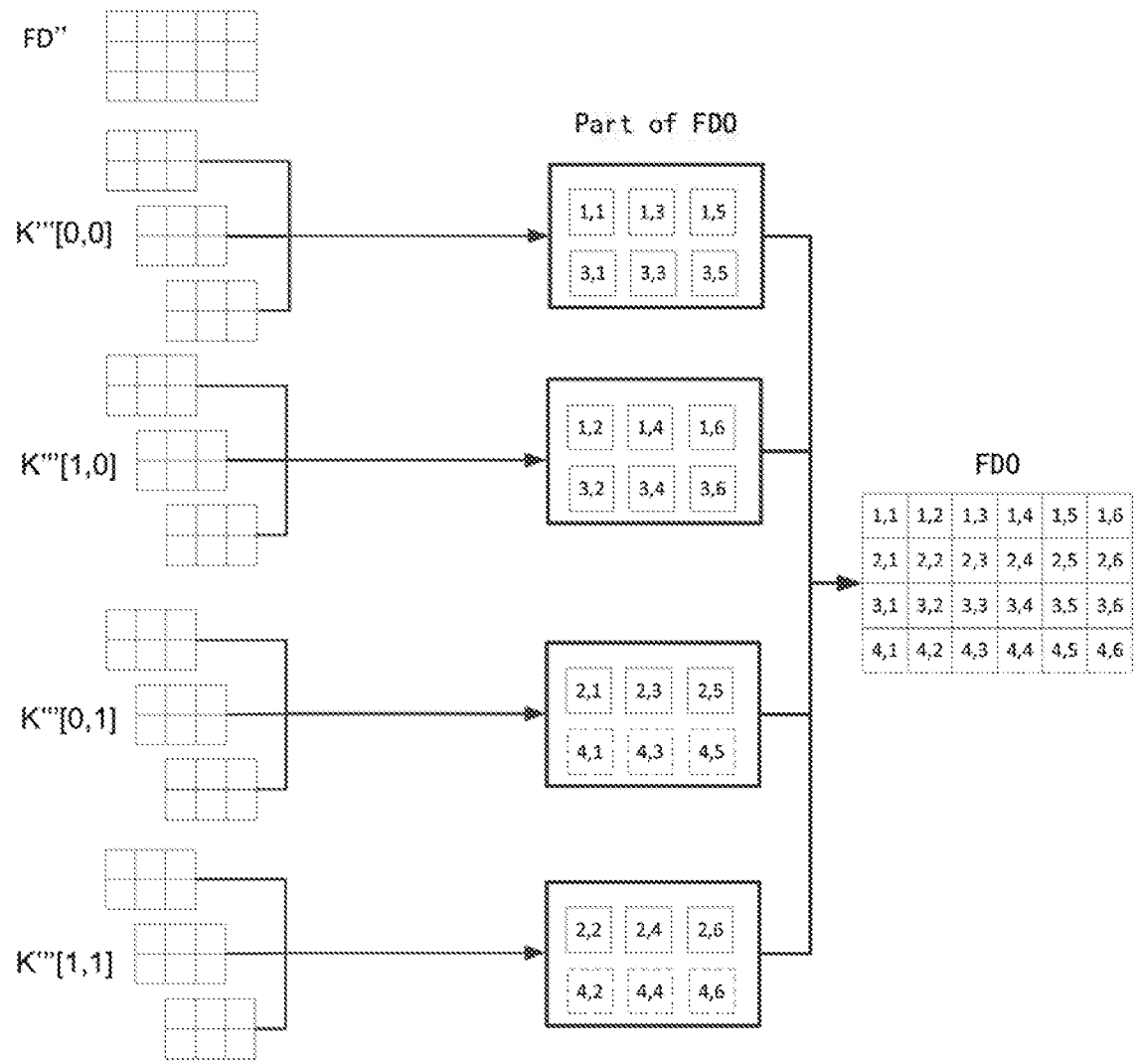
FIG. 8 shows an example of performing a convolution operation according to an embodiment of the present disclosure.

FIG. 8 shows an example of convolution operation in this way. Unlike the example of FIG. 7, in the example of FIG. 8, the four folded convolution kernels K'''[0,0], K'''[0,1], K'''[1,0] and K'''[1,1] each are used to convolve the entire folded feature data FD''', respectively. As shown in FIG. 8, only a portion of the output feature data FDO can be obtained using each of the folded convolution kernels. For example, the folded convolution kernel K'''[0,0] may convolve the folded feature data FD''' to generate a portion of the output feature data FDO including data (1,1), (1,3), (1,5), (3,1), (3,3) and (3,5). The portions of data obtained by using the respective folded convolution kernels may be organized together to obtain the complete output feature data FDO. Similarly, in a case where the weight parameters of the convolution layer include a plurality of convolution kernels, the output feature data FDO in the example of FIG. 8 may correspond to data in a channel of the final output feature data.

In the exemplary method 300, the folded feature data provided to the convolution layer may be directly convolved without firstly unfolding the folded feature data into a conventional unfolded feature data, thereby improving channel utilization and operation efficiency, and reducing cache consumption.

For example, assume that a processing unit (for example, an array of multipliers for convolution operation) is capable of processing 32 channels simultaneously and the convolution kernel of the weight parameters has a width 5 and a height 5. For a width folded image obtained by width-folding a 3-channel 720×1280 RGB image with $N_x=2$, the convolution operation performed directly on the width folded image according to the method of the present disclosure involves an amount of calculations only 60% of that for the convolution operation performed on an unfolded image according to a conventional method, with a rate of effective calculations about 2 times of that in the conventional method, even without considering an extra amount of calculations for unfolding the width folded image. For a width height folded image obtained by folding the 3-channel 720×1280 RGB image in width and height with $N_x=2$, $N_y=2$, the convolution operation performed directly on the width height folded image according to the method of the present disclosure involves an amount of calculations only 36% of that for the convolution operation performed on an unfolded image according to the conventional method, with a rate of effective calculations about 4 times of that in the conventional method, without considering an extra amount of calculations for unfolding the width height folded image.

Figure 9:
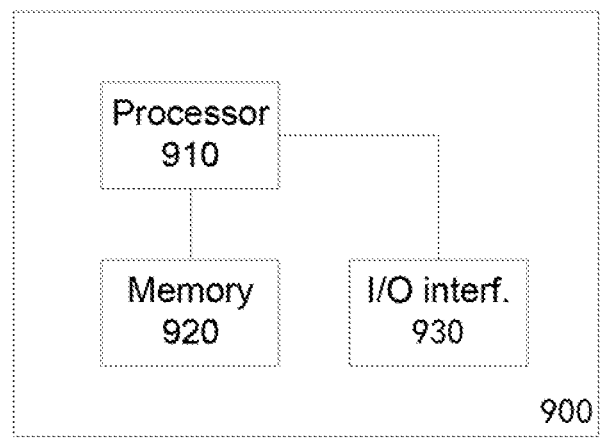
FIG. 9 shows an example of an apparatus for performing a convolution operation on folded feature data according to an embodiment of the present disclosure.
Figure 10:
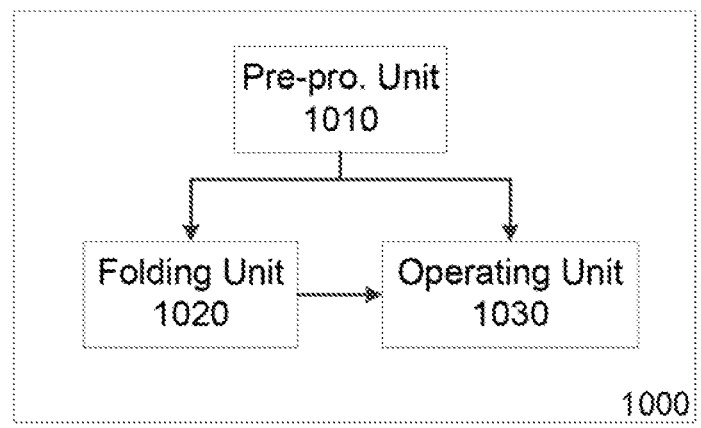
FIG. 10 shows an example of an apparatus for performing a convolution operation on folded feature data according to an embodiment of the present disclosure.

FIG. 9 and FIG. 10 are block diagrams showing exemplary apparatuses for performing a convolution operation on folded feature data according to an embodiment of the present disclosure.

As shown in FIG. 9, an exemplary apparatus 900 may include one or more processors 910. The processor 910 may be a processing unit in any form that is capable of processing data and/or executing instructions, such as a general-purpose CPU, a GPU, or a neural network-dedicated processor or accelerator. For example, the processor 910 may carry out the method of performing a convolution operation on folded feature data according to the embodiments of the present disclosure. In addition, the processor 910 may control other components in the apparatus 900 to perform desired functions.

The processor 910 may be connected to a memory 920 and an I/O interface 930 through a bus system and/or an interconnection mechanism in other forms (not shown).

The memory 920 may include a computer readable writable storage medium in various forms, for example, a volatile memory and/or a non-volatile memory. Examples of the volatile memory may include but not be limited to a random access memory (RAM) and/or a cache, etc. Examples of the non-volatile memory may include but not be limited to a read only memory (ROM), a hard disk, a flash memory, etc. Examples of the readable writable storage medium may include but not be limited to an electric, magnetic, optical, electromagnetic, infrared, or semiconductor system, apparatus, or device or any combination thereof. For example, when being used in combination with the neural network-dedicated processor, the memory 920 may be a RAM on a chip carrying the dedicated processor. The memory 920 may include program instructions for instructing the device 900 to perform the method of performing a convolution operation on folded feature data according to the embodiments of the present disclosure.

The I/O interface 930 may serve to provide parameters or data to the processor 910 and output data processed by the processor 910.

As shown in FIG. 10, an exemplary apparatus 1000 may include a pre-processing unit 1010, a folding unit 1020, and an operating unit 1030.

The pre-processing unit 1010 may be configured to pre-process the folded feature data provided to the convolution layer and the original convolution kernel, in an embodiment, the pre-processing unit 1010 may be configured to perform, for example, Step S305 in the exemplary method 300 as shown in FIG. 3.

The folding unit 1020 may be configured to fold the pre-processed original convolution kernel in at least one dimension of width or height according to the folding manner of the folded feature data to generate one or more folded convolution kernels corresponding to the original convolution kernel. In an embodiment, the folding unit 1020 may be configured to perform, for example, Step S310 in the exemplary method 300 as shown in FIG. 3.

The operating unit 1030 may be configured to perform a convolution operation on the pre-processed folded feature data using the generated one or more folded convolution kernels. In an embodiment, the operating unit 1030 may be configured to perform, for example, Step S315 of the exemplary method 300 shown in FIG. 3.

It should be understood that the apparatuses 900 and 1000 are shown in FIG. 9 and FIG. 10 as examples but not to limit the present disclosure in any way. The apparatus according to the embodiments of the present disclosure may include other components and/or structure as needed.

Figure 11:
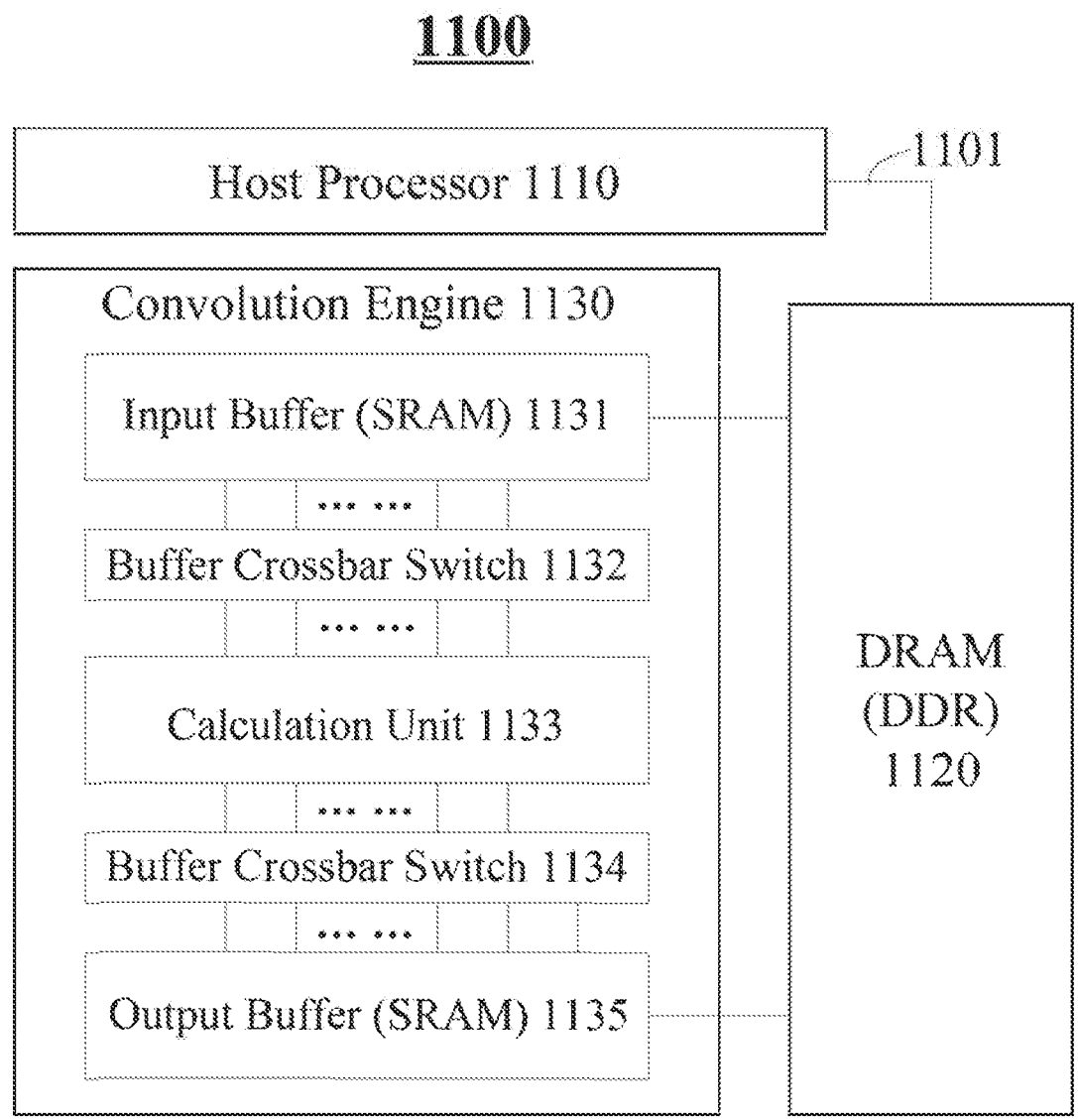
FIG. 11 shows an example of a device for performing a convolution operation on folded feature data according to an embodiment of the present disclosure.

FIG. 11 shows an example of a device for performing a convolution operation on folded feature data according to an embodiment of the present disclosure. Referring to FIG. 11, the device 1100 may include a host processor 1110, a dynamic random access (DRAM) 1120, and a convolution engine 1130. They are interconnected with each other via a bus system 1101.

The host processor 1110 may be an ARM processor, a general-purpose Central Processing Unit (CPU), or any other types of processors or controller, and it can execute program instructions to control operation of other components in the device 1100 such as the DRAM 1120 and the convolution engine 1130 as described below.

The DRAM 1120 may be a DDR RAM or any other types of DRAMs, and it can temporarily store data read from a non-volatile storage such as a magnetic hard disk. For example, the above-mentioned folded feature data and original convolution kernel for a convolution layer in a convolution neural network or program instructions to be executed by the host processor 1110 may be temporarily stored in the DRAM 1120.

The convolution engine 1130 may read the folded feature data and the original convolution kernel from the DRAM 1120 to perform a convolution operation directly on the folded feature data in accordance with any one of the methods disclosed above. The convolution engine 1130 may be formed as a chip, and its components and operations will be discussed below in detail.

Referring to FIG. 11, the convolution engine 1130 may include an input buffer 1131, which may be a static random access memory (SRAM). The folded feature data and the original convolution kernel may be read from the DRAM 1120 and stored in the SRAM 1131, in the example shown in FIG. 11, the folded feature data and the original convolution kernel are stored in the same SRAM 1131. In other examples, they may be stored in separated SRAMs. Before or while being stored in the SRAM 1131, the folded feature data and the original convolution kernel may be pre-processed as described above with reference to FIG. 4. Details of the pre-processing will not be repeated herein.

Figures 12A, 12B:
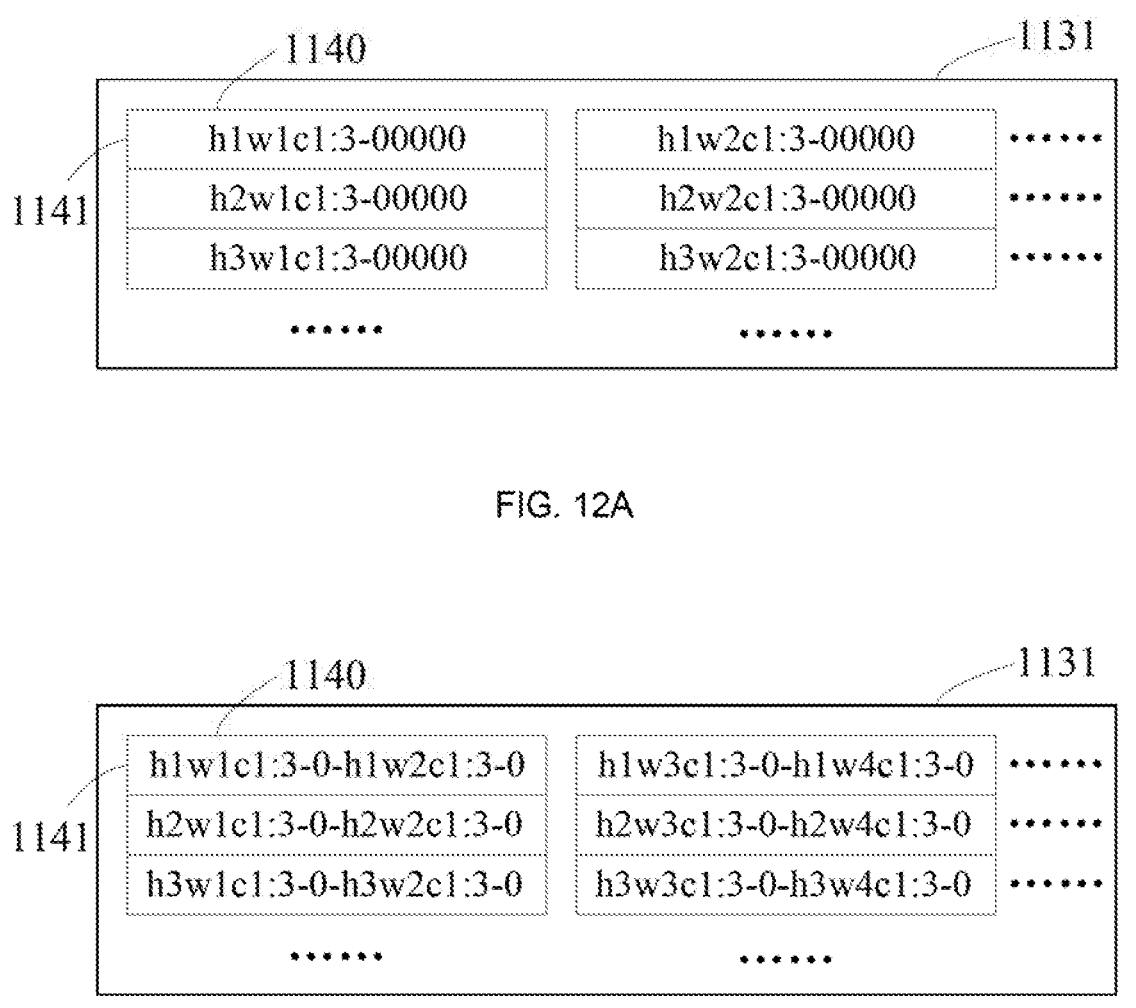

In an embodiment, pre-processing and storing of the folded feature data may be performed In one step. For example, while the folded feature data read from the DRAM 1120 are being written into the SRAM 1131, additional zero values may be inserted into a data stream of the folded feature data so that the folded feature data stored in the SRAM 1131 are pre-processed (padded as described above). FIGS. 12A and 12B show examples of how the feature data are stored in the SRAM 1131, where FIG. 12A shows the original feature data FD of FIG. 1, and FIG. 12B shows the original feature data FD' of FIG. 1.

Referring to FIG. 12A first, the SRAM 1131 may include a plurality of memory units 1141 arranged in plural columns 1140, and each column 1140 may also be called as a "slice". Each memory unit 1141 may include a plurality of memory cells (not shown) for storing a plurality of bits, res. For example, each memory unit 1141 may store 8 bits, 16 bits or more. The number of bits stored in each memory unit 1141 is also called as data width. Each memory unit 14 has an address, and the SRAM slice 1140 is continuously addressed in the column direction. The plurality of memory cells in each memory unit 1141 may be read or written synchronously, and the plurality of SRAM slices 1140 may be read or written synchronously, so that the SRAM 1131 has a data width B*N where B is the data width of the slice 1140 (or the unit 1141) and N is the number of slices 1140 included in the SRAM 1131. Assuming that each memory unit 1141 has a data width of 64, it can store 8 data. As the original feature data FD are not folded, only one pixel (3 data for 3 channels) is stored in each unit 1141, and remaining 40(64−3*8) bits of the unit 1141 are padded with 5 zero values, as shown in FIG. 12A. For the folded feature data FD', however, two pixels may be stored in each unit 1141, and at the end of each pixel is padded only one zero value, as shown in FIG. 12B. In another example, instead, two zero values may be padded at the end of the second pixel. It would be understood that if the unit 1141 has a larger width, more pixels may be stored in each unit 1141. By storing two or more pixels in each unit 1141, more data may be supplied in one period to a calculation unit 1133 described below for performing a convolution operation as compared with only one pixel being stored in one unit 1141, thereby improving computation efficiency of the device 1100.

In addition, the pre-processed original convolution kernel may be folded before or white being stored in the SRAM 1131. As described above with reference to FIGS. 5-6, the pre-processed original convolution kernel may be folded in at least one dimension of width or height according to a folding manner of the folded feature data to generate one or more folded convolution kernels corresponding to the original convolution kernel. Details of the folding will not be repeated herein. The one or more folded convolution kernels may be stored in the SRAM 1131. Also, the pre-processing, folding and storing of the original convolution kernel may be performed in one step. For example, data of the original convolution kernel read from the DRAM 1120 may be written in a predefined format into the SRAM 1131, and additional zero values may be inserted into a data stream of the original convolution kernel so that the convolution kernel stored in the SRAM 1131 is pre-processed and folded as described above. Storage of the one or more folded convolution kernels may be similar to that of the folded feature data as described above with reference to FIGS. 12A and 12B, except that they are stored in different slices 1140. Details of storage of the kernels in the SRAM 1131 will be omitted herein. It should be understood that as the SRAM 1131 has a capability smaller than the DRAM 1120, it may read only a portion of the feature data and a portion of the kernels at one time.

Referring back to FIG. 11, the folded feature data and the one or more folded convolution kernels may be read from the SRAM 1131 into a calculation unit 1133 to perform a convolution operation directly on the folded feature data with the one or more folded convolution kernels. The calculation unit 1133 may include a plurality of multipliers and a plurality of adders for the convolution operation. In an embodiment, the calculation unit 1133 may simultaneously calculate products of plural pixels in the folded feature data each with a corresponding pixel of plural folded convolution kernels. By doing so repeatedly, a same portion of the folded feature data may be convolved by all the folded convolution kernels. For example, if the calculation unit 1133 includes 256 multipliers, it may simultaneously multiply 8 pixels (each having 4 channels, 32 data in total) of the folded feature data each with a corresponding pixel (also having 4 channels) in 8 kernels, generating 84 (8 pixels*8 channels) data. As compared with a conventional case where the feature data is not folded, calculation efficiency is greatly improved.

The calculation results from the calculation unit 1133 may be stored in an output buffer (SRAM) 1135. The input buffer 1131 and the output buffer 1135 each are equipped with a buffer crossbar switch 1132, 1134 to control data provided to or received from the calculation unit 1133. If necessary, the calculation results may also be moved from the output buffer 1135 to the DRAM 1120.

Unless the context clearly requires otherwise, throughout the description and the claims, the words "comprise", "comprising" and the like are to be construed in an inclusive sense, as opposed to an exclusive or exhaustive sense; that is to say, in the sense of "including but not limited to". The word "coupled", as generally used herein, refers to two or more elements that may be either directly connected, or connected by way of one or more intermediate elements. Additionally, the words "herein", "above", "below", and words of similar import, when used in this application, shall refer to this application as a whole and not to any particular portions of this application. Where the context permits, words in the above Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for performing a convolution operation on folded feature data, comprising:
    reading the folded feature data provided to a convolution layer and an original convolution kernel from a dynamic random access memory (DRAM);
    pre-processing the folded feature data and the original convolution kernel;
    storing the pre-processed folded feature data into a static random-access memory (SRAM);
    folding the pre-processed original convolution kernel in at least one dimension of width or height according to a folding manner of the folded feature data to generate one or more folded convolution kernels corresponding to the original convolution kernel;
    storing the one or more folded convolution kernels in the SRAM; and
    reading the pre-processed folded feature data and the one or more folded convolution kernels from the SRAM into a calculation unit for convolving the pre-processed folded feature data with the one or more folded convolution kernels,
    wherein the folded feature data corresponds to a first feature data that is not folded in a first dimension, data of all $C_x$ channels in the $(i_{fx} \times N_x + j_{fx})$th slice of the first feature data in the first dimension correspond to data of consecutive $C_x$ channels starting from the $(j_{fx} \times C_x)$th channel in the $(i_{fx})$th slice of the folded feature data in the first dimension, where the first dimension is one of width or height, $i_{fx}$ is an integer greater than or equal to 0, $N_x$ is an integer greater than 1, $j_{fx}$ is an integer greater than or equal to 0 and less than $N_x$, and $C_x$ is an integer greater than 0, and
    wherein when the original convolution kernel has a first stride in the first dimension that is equal to $N_x$, each of the folded convolution kernels has a stride 1 in the first dimension.

2. The method of claim 1 wherein the SRAM includes a plurality of SRAM cells, at least every two pixels of the pre-processed folded feature data are stored in a same SRAM cell, and at least every two pixels of each folded convolution kernel are stored in a same SRAM cell.

3. The method of claim 1 wherein the calculation unit comprises a plurality of multipliers and a plurality of adders.

4. The method of claim 1 wherein the pre-processing comprises:
    determining a first padding quantity $P_1$ for padding at a starting boundary of the first feature data in the first dimension according to a padding manner specified by the convolution layer, the first padding quantity $P_1$ being greater than or equal to 0;
    padding $\lceil P_1/N_x \rceil$ zero slices at a starting boundary of the folded feature data in the first dimension where "$\lceil\ \rceil$" represents an upward rounding operation; and
    padding $\lceil P_1/N_x \rceil \times N_x - P_1$ zero slices at a starting boundary of the original convolution kernel in the first dimension.

5. The method of claim 1 wherein the convolving comprises:
    in a case where the original convolution kernel has a first stride in the first dimension that is not equal to $N_x$, moving all the folded convolution kernels corresponding to the original convolution kernel by the first stride in the first dimension after convolving a same portion of the pre-processed folded feature data with all the folded convolution kernels corresponding to the original convolution kernel.

6. The method of claim 5 wherein convolving a same portion of the pre-processed folded feature data with all the folded convolution kernels comprises:
    simultaneously calculating, by a plurality of multipliers, products of plural pixels in the pre-processed folded feature data each with a corresponding pixel of plural folded convolution kernels.

7. The method of claim 1 wherein the convolving comprises:
    in a case where the original convolution kernel has a first stride in the first dimension that is not equal to $N_x$, convolving the entire pre-processed folded feature data with each of the folded convolution kernels corresponding to the original convolution kernel, respectively, where each of the folded convolution kernels has a stride in the first dimension that is equal to the first stride.

8. The method of claim 1 wherein folding the pre-processed original convolution kernel in at least one dimension comprises:
    padding $k_x \times S_x$ zero slices at a starting boundary of the pre-processed original convolution kernel in the first dimension to generate $E_x$ first transformed convolution kernels, respectively, where $S_x$ is a first stride of the original convolution kernel in the first dimension, $E_x$ is greater than or equal to 1 and depends on $N_x$ and $S_x$, and $k_x$ is an integer greater than or equal to 0 and less than $E_x$; and
    folding each first transformed convolution kernel in the first dimension by splicing every $N_x$ consecutive slices of the first transformed convolution kernel in the first dimension together in a depth dimension to generate a first folded convolution kernel corresponding to the first transformed convolution kernel.

9. The method of claim 8 wherein data of all $C_x$ channels in the $(i_{kx} \times N_x + j_{kx})$th slice of each first transformed convolution kernel in the first dimension correspond to data of consecutive $C_x$ channels starting from the $(j_{kx} \times C_x)$th channel in the $(i_{kx})$th slice of the corresponding first folded convolution kernel in the first dimension, respectively, where $i_{kx}$ is an integer greater than or equal to 0, and $j_{kx}$ is an integer greater than or equal to 0 and less than $N_x$.

10. The method of claim 8 wherein the first feature data corresponds to a second feature data that is not folded in a second dimension, data of all $C_y$ channels in the $(i_{fy} \times N_y + j_{fy})$th slice of the second feature data in the second dimension correspond to data of consecutive $C_y$ channels starting from the $(j_{fy} \times C_y)$th channel in the $(i_{fy})$th slice of the first feature data in the second dimension, where the second dimension is the other one of width or height, $i_{fy}$ is an integer greater than or equal to 0, $N_y$ is an integer greater than 1, $j_{fy}$ is an integer greater than or equal to 0 and less than $N_y$, and $C_y$ is an integer greater than 0.

11. The method of claim 10 wherein the pre-processing further comprises:
   determining a second padding quantity $P_2$ for padding at a starting boundary of the second feature data in the second dimension according to the padding manner specified by the convolution layer, the second padding quantity $P_2$ being greater than or equal to 0;
   padding $\lceil P_2/N_y \rceil$ zero slices at a starting boundary of the folded feature data in the second dimension where "⌈ ⌉" represents an upward rounding operation; and
   padding $\lceil P_2/N_y \rceil \times N_y - P_2$ zero slices at a starting boundary of the original convolution kernel in the second dimension.

12. The method of claim 10 wherein folding the pre-processed original convolution kernel in at least one dimension further comprises:
   padding $k_y \times S_y$ zero slices at a starting boundary of each first folded convolution kernel in the second dimension to generate $E_y$ second transformed convolution kernels for each first folded convolution kernel, where $S_y$ is a second stride of the original convolution kernel in the second dimension, $E_y$ is greater than or equal to 1 and depends on $N_y$ and $S_y$, and $k_x$ is an integer greater than or equal to 0 and less than $E_x$; and
   folding each second transformed convolution kernel in the second dimension by splicing every $N_y$ consecutive slices of the second transformed convolution kernel in the second dimension together in the depth dimension to generate a second folded convolution kernel corresponding to the second transformed convolution kernel.

13. The method of claim 12 wherein data of all $C_y$ channels in the $(i_{ky} \times N_y + j_{ky})$th slice of each second transformed convolution kernel in the second dimension correspond to data of consecutive $C_y$ channels starting from the $(j_{ky} \times C_y)$th channel in the $(i_{ky})$th slice of the corresponding second folded convolution kernel in the second dimension, respectively, where $i_{ky}$ is an integer greater than or equal to 0, and $j_{ky}$ is an integer greater than or equal to 0 and less than $N_y$.

14. The method of claim 10 wherein the convolving further comprises:
   in a case where the original convolution kernel has a second stride in the second dimension that is not equal to $N_y$, moving all the folded convolution kernels corresponding to the original convolution kernel by the second stride in the second dimension after convolving a same portion of the pre-processed folded feature data with all the folded convolution kernels corresponding to the original convolution kernel.

15. The method of claim 10 wherein the convolving further comprises:
   in a case where the original convolution kernel has a second stride in the second dimension that is not equal to $N_y$, convolving the entire pre-processed folded feature data with each of the folded convolution kernels corresponding to the original convolution kernel, respectively, where each of the folded convolution kernels has a stride in the second dimension that is equal to the second stride.

16. The method of claim 10 wherein when the original convolution kernel has a second stride in the second dimension that is equal to $N_y$, each folded convolution kernel has a stride 1 in the second dimension.

17. An apparatus for performing a convolution operation on folded feature data comprising:
   one or more processors configured to execute instructions, execution of the instructions causing the one or more processors to perform the following steps:
      reading the folded feature data provided to a convolution layer and an original convolution kernel from a dynamic random access memory (DRAM);
      pre-processing the folded feature data and the original convolution kernel;
      storing the pre-processed folded feature data into a static random-access memory (SRAM);
      folding the pre-processed original convolution kernel in at least one dimension of width or height according to a folding manner of the folded feature data to generate one or more folded convolution kernels corresponding to the original convolution kernel;
      storing the one or more folded convolution kernels in the SRAM; and
      reading the pre-processed folded feature data and the one or more folded convolution kernels from the SRAM into a calculation unit for convolving the pre-processed folded feature data with the one or more folded convolution kernels,
   wherein the folded feature data corresponds to a first feature data that is not folded in a first dimension, data of all $C_x$ channels in the $(i_{fx} \times N_x + j_{fx})$th slice of the first feature data in the first dimension correspond to data of consecutive $C_x$ channels starting from the $(j_{fx} \times C_x)$th channel in the $(i_{fx})$th slice of the folded feature data in the first dimension, where the first dimension is one of width or height, $i_{fx}$ is an integer greater than or equal to 0, $N_x$ is an integer greater than 1, $j_{fx}$ is an integer greater than or equal to 0 and less than $N_x$, and $C_x$ is an integer greater than 0, and
   wherein when the original convolution kernel has a first stride in the first dimension that is equal to $N_x$, each of the folded convolution kernels has a stride 1 in the first dimension.

* * * * *